R. C. HENDERSON.
SEED BOOT FOR CORN PLANTERS.
APPLICATION FILED JULY 18, 1917. RENEWED MAR. 7, 1919.
1,304,312.
Patented May 20, 1919.
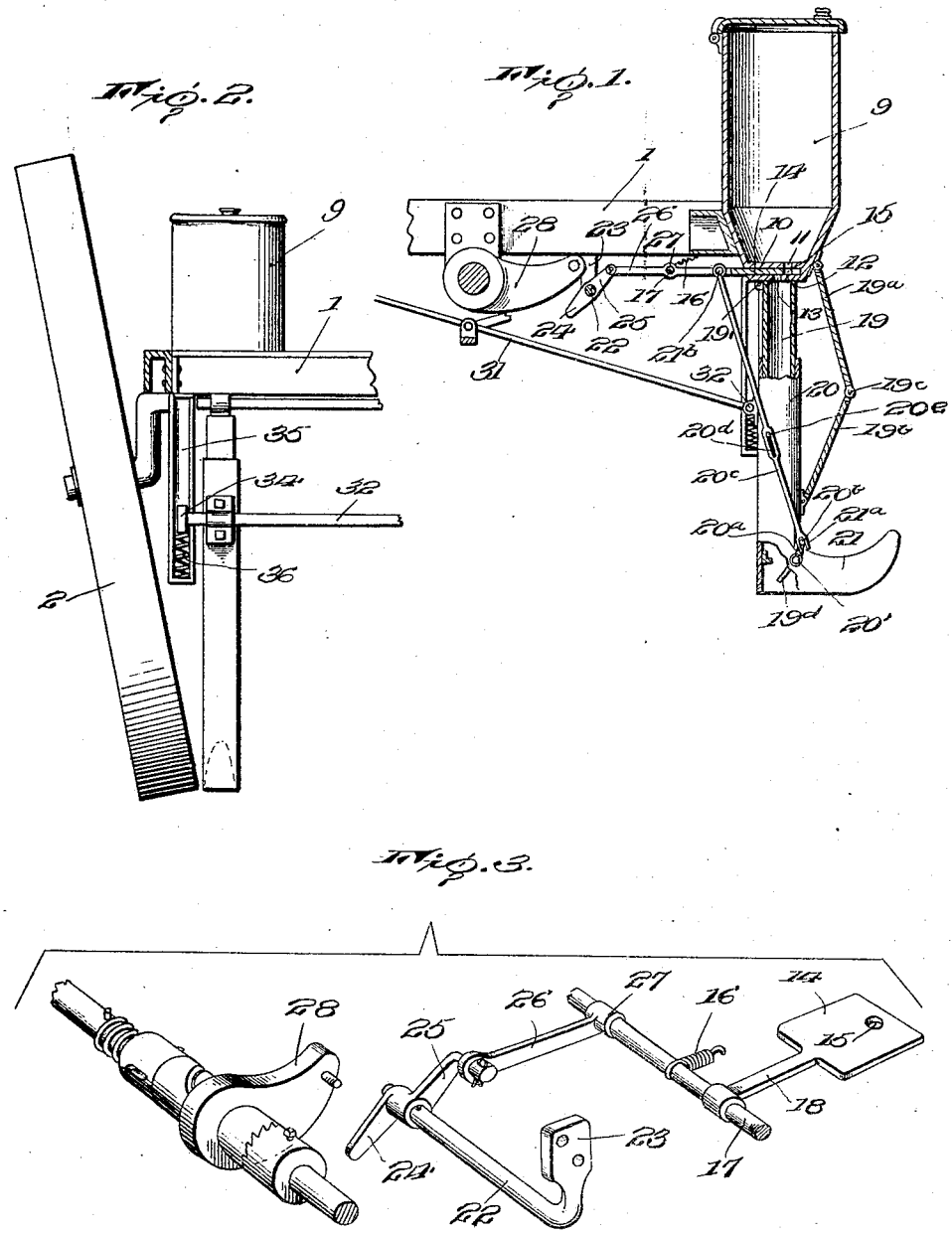

UNITED STATES PATENT OFFICE.

RUFUS C. HENDERSON, OF KANKAKEE, ILLINOIS.

SEED-BOOT FOR CORN-PLANTERS.

1,304,312. Specification of Letters Patent. Patented May 20, 1919.

Original application filed April 14, 1916, Serial No. 94,948. Divided and this application filed July 18, 1917, Serial No. 181,378. Renewed March 7, 1919. Serial No. 281,292.

*To all whom it may concern:*

Be it known that I, RUFUS C. HENDERSON, a citizen of the United States, residing at Kankakee, in the county of Kankakee and State of Illinois, have invented certain new and useful Improvements in Seed-Boots for Corn-Planters, of which the following is a specification.

This invention relates to an improvement in the seed boots and seed dropping mechanisms of corn planters and the present application is a division of my application filed Apr. 14, 1916, Serial No. 94,948.

It is one aim of the present invention to provide means for discharging the seed from the seed hopper into the boot, collecting the discharged seed in the lower end of the boot, and dropping the collected seed into the furrow at the proper moment.

The invention also aims to provide means whereby the boot may be raised and lowered so that when the seed is not being dropped the boot may be positioned above the furrow.

Another aim of the invention is to provide means for bracing the lower or movable section of the boot both in its raised and lowered positions.

In the accompanying drawings:

Figure 1 is a vertical front to rear sectional view, parts being shown in elevation, of the boot embodying the present invention;

Fig. 2 is a rear elevation thereof;

Fig. 3 is a group perspective view of several of the parts comprising the invention.

In the drawings, the frame of the planter is indicated in general by the numeral 1 and the same is supported by means of ground wheels 2. The seed hopper is indicated by the numeral 9 and it will be understood that any number of these hoppers may be arranged upon the frame of the machine depending upon the number of furrows which are to planted at a time. Each of the seed hoppers 9 is provided with a false bottom 10 having the usual seed outlet opening 11, and is further provided with a bottom 12 having a seed outlet opening 13. A valve plate 14 is slidably mounted within the hopper 9 between the bottoms 10 and 12 in the manner clearly shown in Fig. 1 of the drawings, and is provided with a seed pocket 15. The valve plate 14 is normally held forwardly or in the position shown in Fig. 1 of the drawings, by means of a spring 16 which is connected at its forward end to the frame and at its rear end to a rod 17 to which all of the valve plates of the several hoppers are connected by integral shanks 18. By reference to Fig. 1 it will be observed that in the normal position of the valve plate 14 the opening in the seed pocket will be in registration with the seed outlet opening 11 but out of registration with the seed outlet opening 13 and it will further be understood that in this position, the grains of corn will be received within the pocket 15 so that upon rearward sliding movement of the valve plate, the collected grains will drop through the opening 13 when the seed pocket comes opposite this opening. Each seed pocket is provided with a seed boot comprising a section 19 connected to the bottom 12 of the respective hopper and to which is slidably and telescopically fitted the upper end of the other section of the boot, indicated by the numeral 20, this section at its lower end terminating in the boot proper indicated by the numeral 21, it will now be apparent that the section 20 of the seed boot may be slid upwardly upon the section 19 so as to raise the boot 21 out of the furrow and that, on the other hand, the section 20 may be slid downwardly upon the section 19 so as to lower the boot into the furrow in position for the depositing of the seed in hills as the valve plates are reciprocated through actuating mechanism provided for that purpose.

The upper end of the section 19 of the seed boot is hingedly connected, as at 19' to the underside of the bottom 12 of the seed hopper and in order to brace the seed boot and particularly the lower section thereof in its raising and lowering movements, plates 19ª and 19ᵇ are hingedly connected to each other at their lower and upper ends, respectively, as at 19ᶜ, and are respectively pivoted at their upper and lower ends to the seed hopper and the lower section of the seed boot. It will be understood by reference to Fig. 1 of the drawings that when the valve plate 14 is slid rearwardly the seed collected in the pocket will drop through the seed discharge opening 13 and in order that the seed may be collected and retained at the lower end of the section 20 of the boot and, subsequently discharged into the furrow at the proper time, a valve plate 19ᵈ is mounted for oscillatory movement within the rear end of the boot 21, the said plate being fixed upon a transverse shaft 20′ carrying an arm 20ᵃ provided with a laterally projecting pin 20ᵇ. An actuating rocking arm 20ᶜ is provided between its upper and lower ends with a slot 20ᵈ in which works a laterally projecting rod 20ᵉ projecting from the lower section 20 of the seed boot. The lower end of the actuating arm 20ᶜ is provided with a fork 21ᵃ engaging the pin 20ᵇ and the upper end of the said arm is pivotally connected, as at 21ᵇ to the shank 18 of the valve plate 14. When the valve plate 14 is closed, the valve plate 19ᵈ is open, or in the position shown in Fig. 1, but when the valve plate 14 is slid rearwardly to deposit the collected seed, the valve plate 19ᵈ is swung upwardly through the rocking movement of the arm 20ᶜ to closed position and will receive the seed discharged through the opening 13. Then as the valve plate 14 is again slid forwardly to closed position, the valve plate 19ᵈ will be swung down to the open position above referred to. A supporting rod 22 is connected at its ends by bracket portions 23 with the frame of the machine and mounted for oscillatory movement upon the said supporting rod is a rocker 24. Each rocker includes an arm 25 which extends upwardly and forwardly and has pivotally connected to it one end of a link 26, the other end of which link is pivotally connected, as at 27, with the rod 17. Each rocker further includes an arm which extends downwardly and rearwardly and is designed to be successively engaged by a tappet device 28 actuated in any suitable manner. The numeral 31 indicates a lever member which is mounted in the frame of the machine for rocking movement and which is preferably adapted to be actuated by foot, and at its forward end this lever device is connected to a bar 32 which extends transversely of the front of the machine and is secured to all of the seed boot sections 20. The ends of this bar 32 are provided with blocks 34 which are slidably mounted each within a channeled guide member 35 depending from the side of the frame of the machine, the bar being in this manner guided in its vertical movement in raising and lowering the seed boots simultaneously. In order that the downward movement of the bar 32 may be cushioned and in order, therefore, to provide against the seed boots being thrust too violently into the furrows, cushioning springs 36 are employed and are mounted within the guide members 35 and support said blocks 34, this structure being clearly shown in Fig. 2 of the drawings.

Having thus described the invention, what is claimed as new is:

1. In seed planting mechanism of the class described, a seed hopper, a boot comprising a section extending downwardly from the hopper, a section telescopically fitting the first mentioned section, means for raising and lowering the second mentioned section upon the first mentioned section, a brace for the sections comprising pivotally connected members, a reciprocating valve plate for controlling the discharge of the seed from the hopper into the boot, means for reciprocating the said valve plate, a collecting valve plate mounted for swinging movement in the lower portion of the boot, a pin upon the lower section of the boot, and a rod pivoted at its upper end to the first mentioned valve plate and operatively connected at its lower end with the collecting valve plate, the said rod between its ends being formed with a slot receiving the said pin.

2. In seed planting mechanism of the class described, a seed hopper, a seed boot extending downwardly therefrom, a reciprocating valve plate for controlling the discharge of the seed from the hopper into the boot, means for reciprocating the said valve plate, a collecting valve plate mounted for swinging movement in the lower portion of the boot, and a rod pivotally mounted between its ends upon the said boot, the said rod being operatively connected at its upper end with said reciprocating valve plate and at its lower end with the collecting valve plate thereby to provide for simultaneous actuation of the said plates.

3. In seed planting mechanism of the class described, a seed hopper, a boot comprising a section extending downwardly from the hopper, a section telescopically fitting the first-mentioned section, means for raising and lowering the second-mentioned section upon the first-mentioned section, a brace for the sections comprising mutually pivotally connected members, one pivotally connected with the hopper and the other with the lower boot section, a valve for controlling the discharge of seed from the hopper into the boot, means for actuating the valve, a valve for controlling the discharge of seed from the lower end of the boot, and a rod having a floating fulcrum connection with the lower section of the boot and operatively connected with the first and second-mentioned valves, respectively, at its upper and lower ends.

In testimony whereof I affix my signature.

RUFUS C. HENDERSON. [L. S.]

Copies of this patent may be obtained for five cents each, by addressing the "Commissioner of Patents, Washington, D. C."